(12) United States Patent
Wu

(10) Patent No.: US 6,644,806 B2
(45) Date of Patent: *Nov. 11, 2003

(54) RESILIENT NON-SMOOTH PROJECTION MEMBER ON EYEGLASS TEMPLES AND NOSE PADS

(76) Inventor: Huei-Min Wu, No. 87, Yu Hsin 1. Street, Tainan City, Taiwna (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/801,975

(22) Filed: Mar. 8, 2001

(65) Prior Publication Data
US 2002/0126253 A1 Sep. 12, 2002

(51) Int. Cl.[7] .............................. G02C 5/14; G02C 5/12
(52) U.S. Cl. ....................... 351/122; 351/123; 351/136; 351/139
(58) Field of Search ............................... 351/111, 122, 351/123, 136, 138, 139

(56) References Cited

U.S. PATENT DOCUMENTS

| | | | | | |
|---|---|---|---|---|---|
| 4,070,104 | A | * | 1/1978 | Rice | 351/138 |
| 4,165,925 | A | * | 8/1979 | Donovan | 351/139 |
| 4,204,749 | A | * | 5/1980 | Davis | 351/123 |
| 4,662,729 | A | * | 5/1987 | Dobson | 351/123 |
| 5,345,616 | A | | 9/1994 | Wiedner | |
| 5,369,451 | A | | 11/1994 | Tamagawa | |

FOREIGN PATENT DOCUMENTS

| | | |
|---|---|---|
| EP | 0529202 | 3/1993 |
| EP | 0633487 | 1/1995 |
| FR | 2821936 | 9/2002 |
| GB | 2373868 | 10/2002 |

* cited by examiner

Primary Examiner—Hung Xuan Dang
(74) Attorney, Agent, or Firm—Alan Kamrath; Rider Bennett, LLP

(57) ABSTRACT

A resilient non-smooth projection member formed into shape on eyeglass temples and on nose pads and having a plurality of grain-like projections on a touching surface of soft protruding pads of each eyeglasses temple or nose pad. The backside of each grain-like projection has a recessed, hollow shape, and these grain-like projections touch a wearer's ear sides and nose, giving rise to resilient massage, allowing for comfortable wear of the eyeglasses.

15 Claims, 5 Drawing Sheets

(I-I)

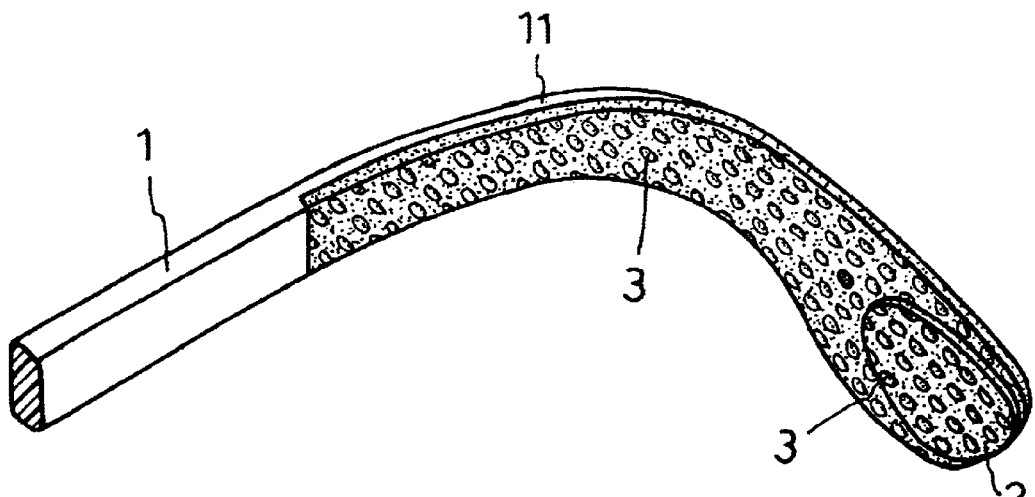
FIG.4
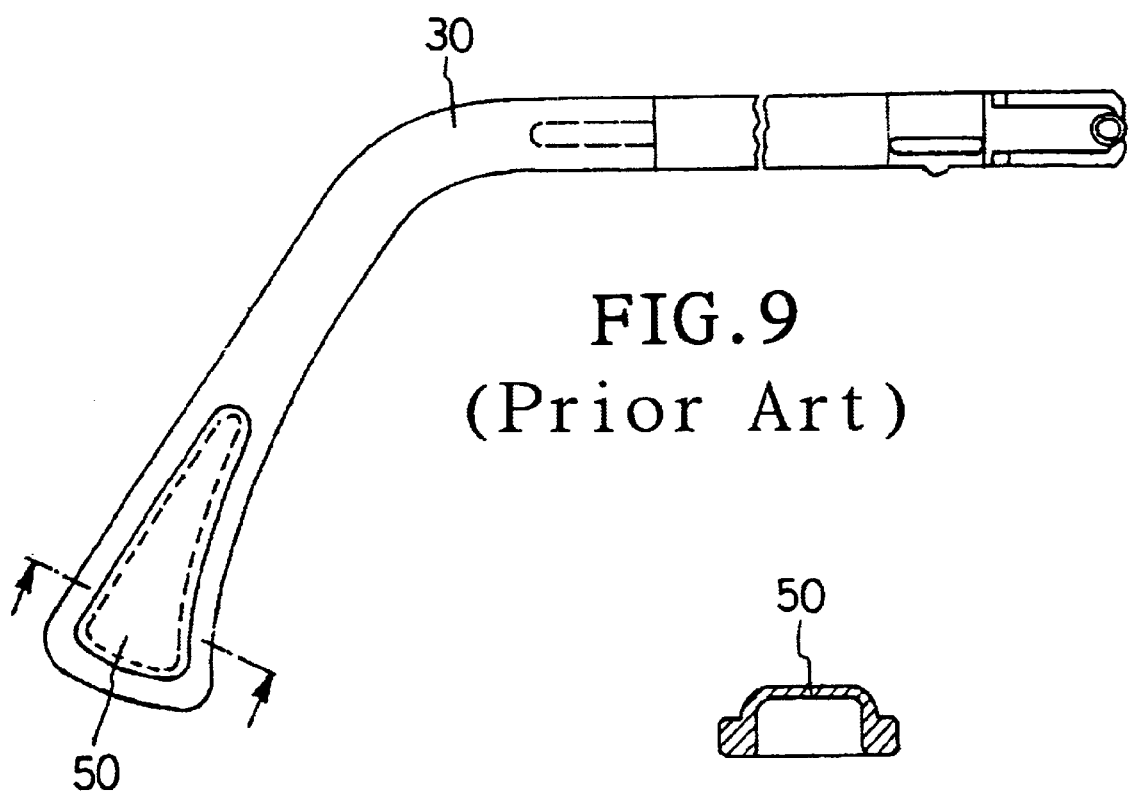
FIG.9 (Prior Art)
FIG.10 (Prior Art)

(V-V)

RESILIENT NON-SMOOTH PROJECTION MEMBER ON EYEGLASS TEMPLES AND NOSE PADS

BACKGROUND OF THE INVENTION

This invention relates to a resilient non-smooth projection member formed integrally with eyeglass temples or nose pads, particularly to one having soft grain-like projections on a touching surface between the eyeglass temples or nose pads and a wearer's ear sides or nose, possibly to achieve a function of good resilient massage.

Some professional manufacturers of optical eyeglasses have tried to work out such eyeglasses for any consumer to wear comfortably. One such design provides soft pads on eyeglasses temples and nose pads, as shown in FIGS. 7, 8, 9 and 10. In accordance with such design, projection pads 40 and 50 made of soft rubber are respectively provided inside nose pads 20 of an eyeglasses frame 10 and on an end side of each temple 30 so that these soft projection pads 40 and 50 serve as a buffer to not directly press against a wearer's skin, avoiding any scar left around his/her ear sides or nose caused by long-term wear.

With a view to releasing an eyeglasses wearer from feeling pressed around ear sides or nose due to long-term wear, and acquiring a comparatively comfortable wearing condition, this invention offers a soft grain-like projection formed integrally on eyeglasses temples or on nose pads having a function of resilient massage.

SUMMARY OF THE INVENTION

The objective of the invention is to provide a projection pad with a plurality of grain-like projections provided on a touching surface of soft protruding pads of each eyeglass temple and nose pad. The touching surfaces each define a length and a width. These grain-like projections respectively have a back side with a recessed hollow shape and have a function of generating appropriate resilient massage when touching a wearer's skin around his/her ear side or nose. The grain-like projections are spaced from each other in the length and width of the touching surface of the projection pads.

Another objective of the invention is to provide a soft touching member formed integrally at the hind half portion of each eyeglass temple that conforms to a touching position of a user's ear sides to achieve a comfortable wearing condition.

One more objective is to offer a member having a plurality of grain-like projections formed integrally on both the soft touching portion and protruding touching surface of each eyeglass temple so as to acquire a better effect of resilient massage around a wearer's ears.

Yet another object of the invention is to provide a resilient projection member for a pair of eyeglasses having temples and nose pads. A soft plastic projection pad is disposed on each said nose pad and each has a length and a width. First and second soft plastic projection pads are disposed on each said eyeglass temple, and each has a length and a width. The nose pad projection pads and the eyeglass temple projection pads each define a touching surface having a plurality of projections, with each of the projections being spaced from each other in directions of the width and the length.

Still another object of the invention is to provide a resilient projection member for a pair of eyeglasses having temples and nose pads. The resilient projection member has a soft plastic projection pad having a length and a width and which is attached to the eyeglasses at a contact point on the eyeglasses where the eyeglasses contact a wearers head. The projection pad also has a plurality of projections, with each of the projections being spaced from each other in directions of the width and the length of the projection pad.

BRIEF DESCRIPTION OF DRAWINGS

This invention will be better understood by referring to the accompanying drawings, wherein:

FIG. 4 is perspective view of a soft touching portion of an eyeglass temple in the present invention.

FIG. 9 is a perspective view of a prior art projection member of an eyeglass temple.

FIG. 10 is a partial cross-sectional view of a prior art projection member of an eyeglass temple.

DETAILED DESCRIPTION OF THE PREFERRED EMBODIMENT

Figure 1:
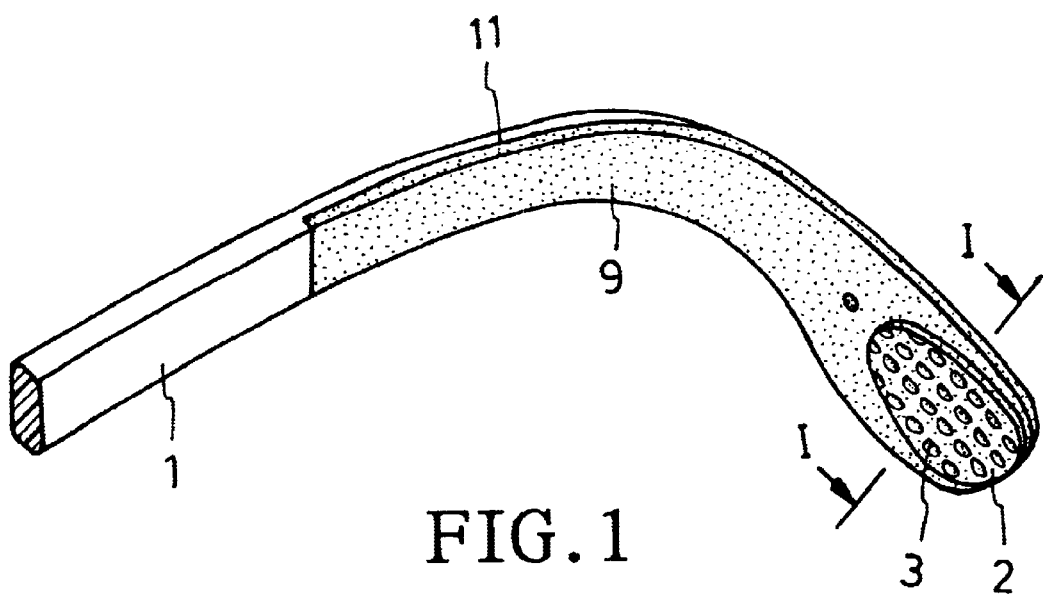
FIG. 1 is a perspective view of a projection member of an eyeglass temple in the present invention.
Figure 2:
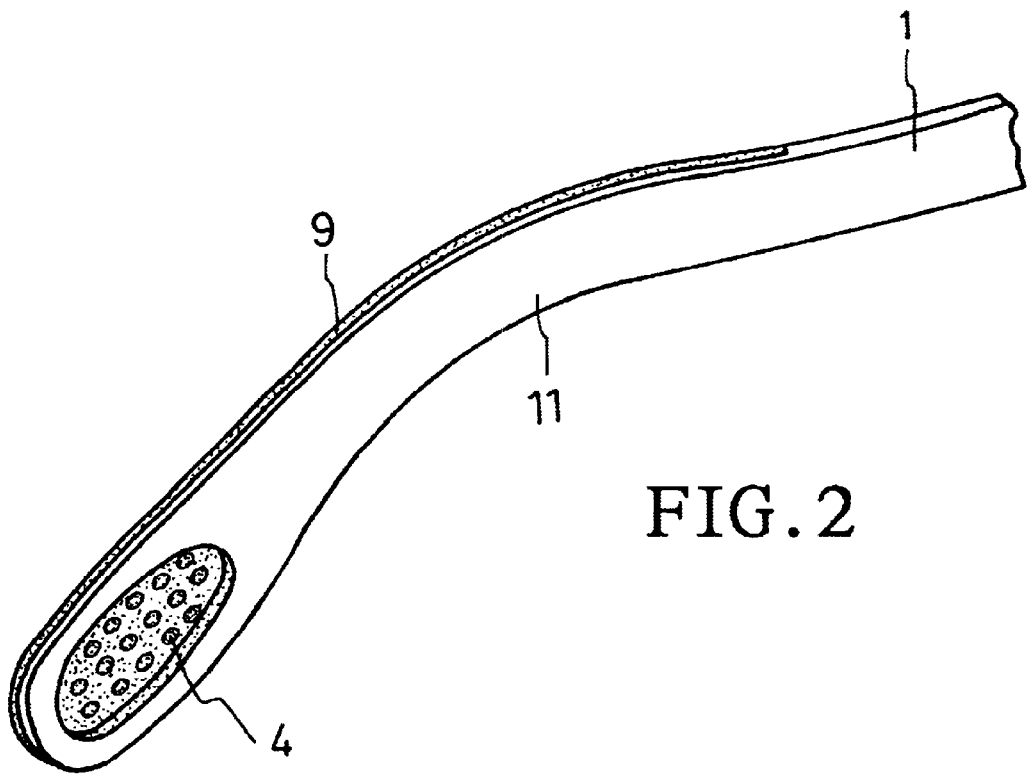
FIG. 2 is a perspective view of the projection member of an eyeglass temple seen from another direction in the present invention.
Figure 3:
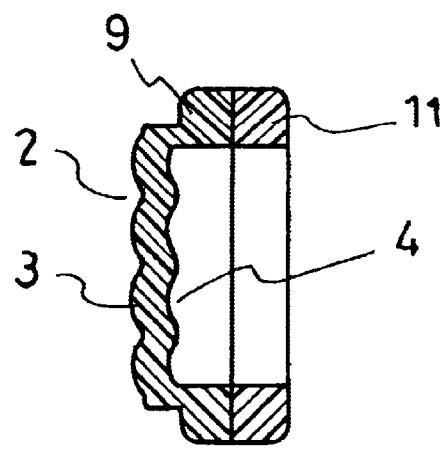
FIG. 3 is a side view of the line 1—1 in FIG. 1.
Figure 6:
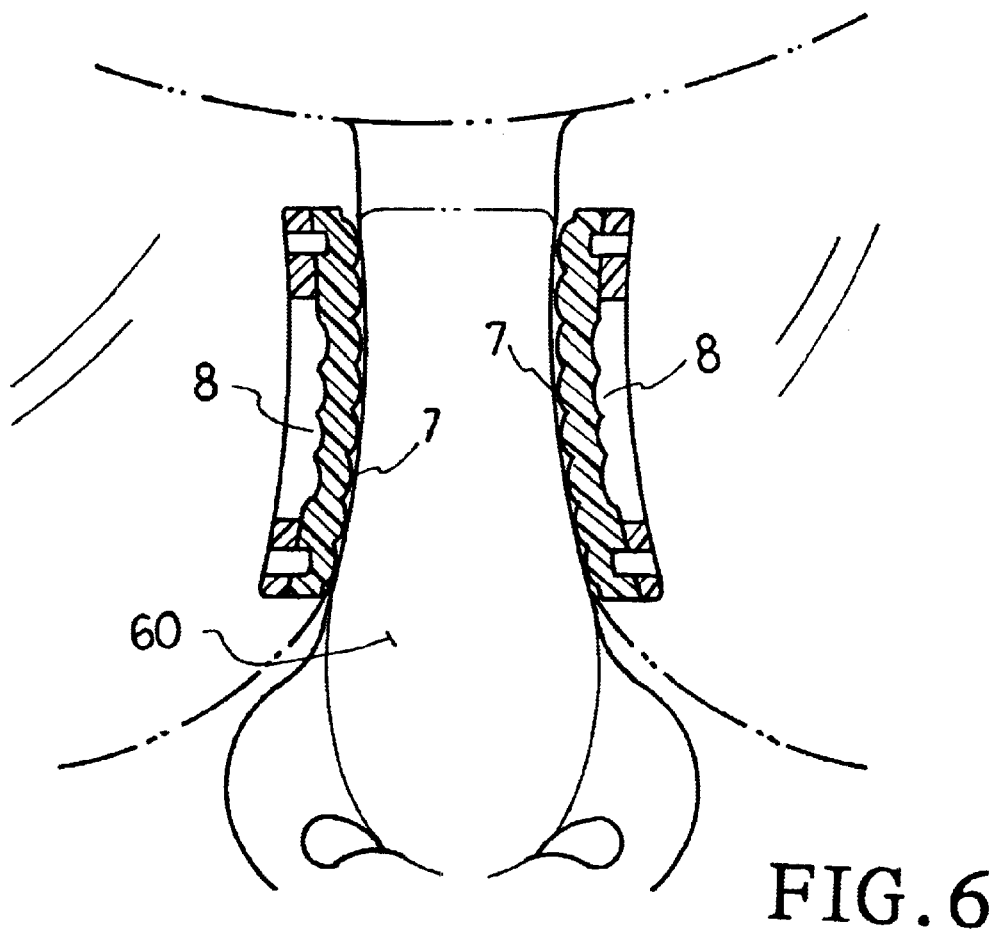
FIG. 6 is a front view of the projection members of the nose pads matching and touching a wearer's nose in the present invention.
Figure 5:
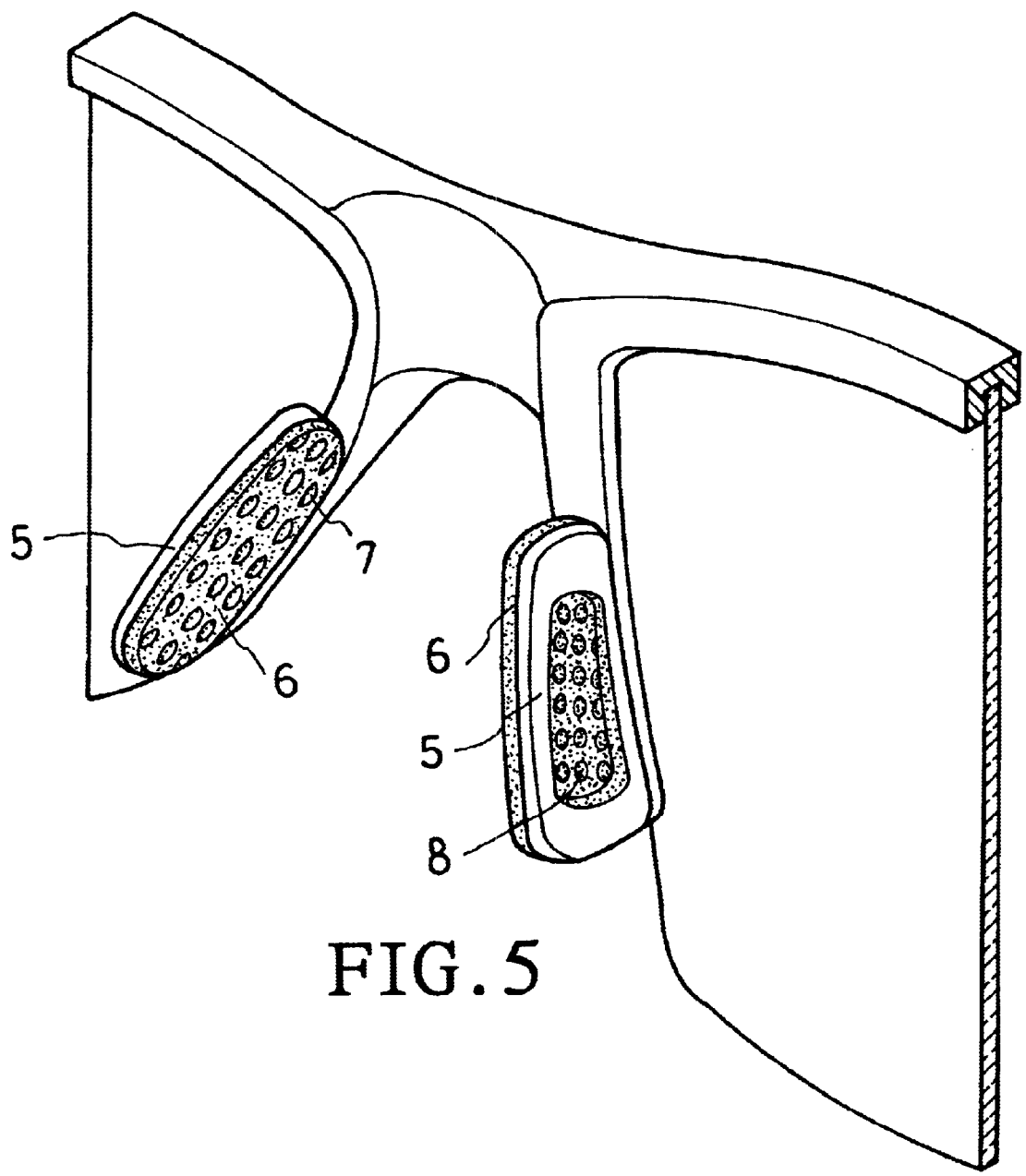
FIG. 5 is perspective view of projection members on nose pads in the present invention.
Figure 7:
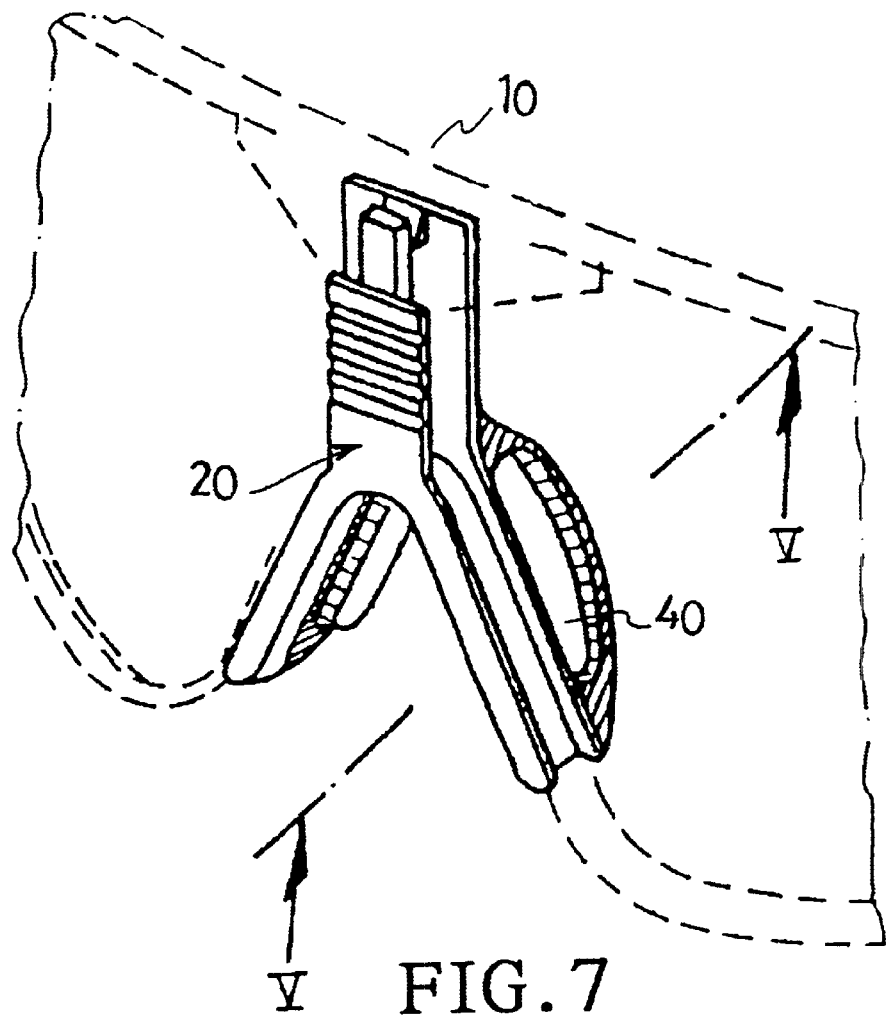
FIG. 7 is a perspective view of a prior art projection member on nose pads.
Figure 8:
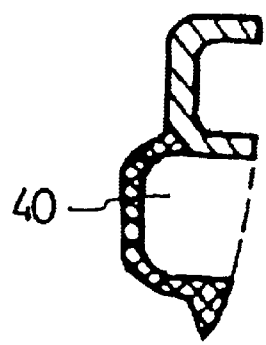
FIG. 8 is a partial cross-sectional view of a prior art projection member on the nose pads.

A resilient non-smooth projection member formed on an eyeglass temple or on a nose pad, as shown in FIGS. 1, 2 and 5, has a plurality of grain-like projections 3 and 7 on a protruding touching surface 2 and 6 of soft projection pads of eyeglass temples 1 and nose pads 5, and the back side of each grain-like projection 3 and 7 is a recessed hollow 4 and 8, as shown in FIGS. 3 and 6. Then, a hind half portion 11 of each eyeglasses temple 1 contacting a wear's ear side is a soft touching portion 9 formed integrally.

In addition, the soft touching portion 9 of the eyeglass temple 1 can also be provided with a plurality of grain-like projections similar to those of the protruding touching surface 2, as shown in FIG. 4.

As can be noted from the above description, when the touching surface 2 and 6 of the eyeglasses temple 1 and the nose pad 5 touch a wearer's ear side or nose 60, as shown in FIG.

6, the grain-like projections 7 on the touching surface 6 causes appropriate resilient massage to occur. Moreover, the soft touching portion 9 formed on a hind half portion 11 of the eyeglasses temple 1 and its balanced spreading grain-like projections 3 will permit a wearer to feel comfortable when wearing the eyeglasses, and, receive a resilient massage at the touching surface at the same time.

While the preferred embodiment of the invention has been described above, it will be recognized and understood that various modifications may be made therein and the appended claims are intended to cover all such modifications that may fall within the spirit and scope of the invention.

I claim:

1. A resilient non-smooth projection member for eyeglass temples and nose pads, comprising:
   a projection pad made of soft plastic on each said eyeglass temple and each said nose pad, with each said projection pad having a touching surface corresponding with a touching position of a wearer's ear side and nose, with each said touching surface having a length and a width; and
   a plurality of grain-like projections provided on each said touching surface of said projection pad of each said eyeglass temple and each said nose pad, with each of said grain-like projections being spaced from each other in directions of said length and said width of said touching surface and with a back side of each said grain-like projection having a recessed hollow shape; said plurality of grain-like projections simultaneously causing resilient massage when said eyeglasses are worn.

2. The resilient non-smooth projection member for eyeglass temples and nose pads as claimed in claim 1, wherein a hind half portion of said eyeglass temple matching a wearer's ear side is a soft touching member formed integrally with each said eyeglass temple, with the soft touching member causing resilient massage when said eyeglasses are worn.

3. The resilient non-smooth projection member for eyeglass temples and said nose pads as claimed in claim 2, wherein said soft touching member of each said eyeglass temple is provided with the plurality of grain-like projections so as to render resilient massage on said touching surface between said eyeglass temple and the users ear side.

4. A resilient projection member for a pair of eyeglasses temples and nose pads, comprising:
   a soft plastic projection pad on each said nose pad; and
   first and second soft plastic projection pads on each said eyeglass temple, with each projection pad having a length and a width;
   wherein said nose pad projection pads and said eyeglass temple projection pads each define a touching surface comprising a plurality of projections, with each of said projections being spaced from each other in directions of said width and said length, with each of the plurality of projections being soft to cause resilient massage when said eyeglasses are worn;
   wherein said projections on said eyeglass temple projection pads are integrally formed with said temple, and said projections on said nose pad projection pads are integrally formed with said nose pads;
   wherein said projections are grain-like and have a dimension in a width direction and a dimension in a height direction that are substantially equal, with each said grain-like projection defining a recessed hollow shape having an open back.

5. The projection member of claim 4 wherein a hind half portion of each said eyeglass temple defines an inner surface and comprises a soft touching member, and wherein said soft touching member is integrally formed with said eyeglass temple, with the soft touching member causing resilient massage when said eyeglasses are worn.

6. The projection member of claim 4 wherein said projections are arranged in multiple columns and multiple rows.

7. The projection member of claim 6 wherein said multiple columns are parallel to each other and said multiple rows are parallel to each other.

8. The projection member of claim 6 wherein said multiple columns are equally spaced from each other and said multiple rows are equally spaced from each other.

9. A resilient projection member for a pair of eyeglasses having temples and nose pads, comprising:
   a soft plastic projection pad having a length and a width, with the soft plastic projection pad being attached to said eyeglasses at a contact point on said eyeglasses where said eyeglasses contact a wearer's head;
   wherein said projection pad comprises a plurality of projections, with each of said projections being spaced from each other in directions of said width and said length of said projection pad;
   wherein said projections are grain-like and each has a dimension in a width direction and a dimension in a height direction that are substantially equal, with each said grain-like projection defining a recessed hollow shape having an open back side.

10. The projection member of claim 9 wherein said contact point comprises said nose pads.

11. The projection member of claim 9 wherein said contact point comprises an ear contacting portion of said temples.

12. The projection member of claim 9 wherein said projections are arranged in multiple columns and multiple rows.

13. The projection member of claim 12 wherein said multiple columns are parallel to each other and said multiple rows are parallel to each other.

14. The projection member of claim 12 wherein said multiple columns are equally spaced from each other and said multiple rows are equally spaced from each other.

15. The projection member of claim 9, with the spacings between the projections being equal in the width direction and in the height direction.

* * * * *